Aug. 6, 1940.  A. L. FREEDLANDER  2,210,073
V-BELT WITH SMALL GROOVES ON UNDERSIDE
Filed June 4, 1938  3 Sheets-Sheet 1
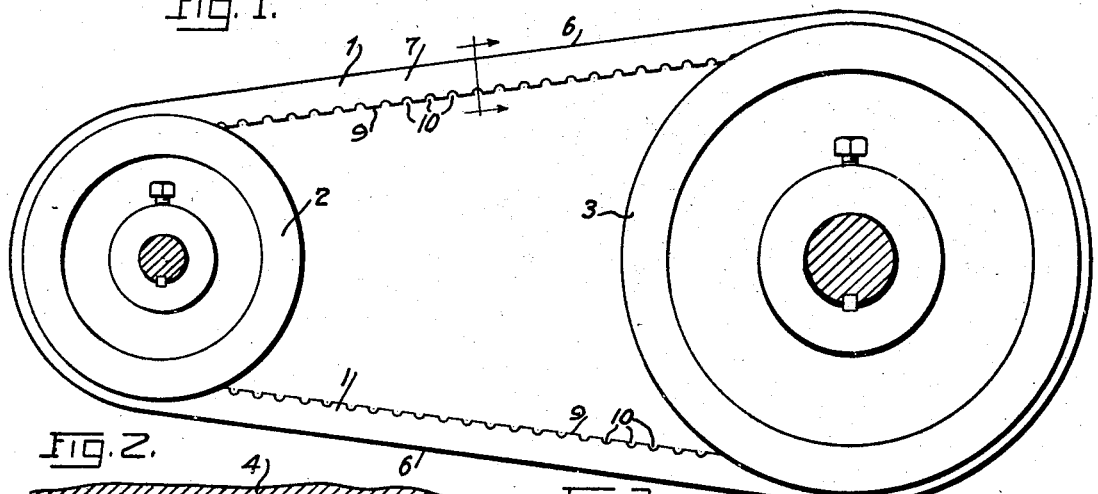
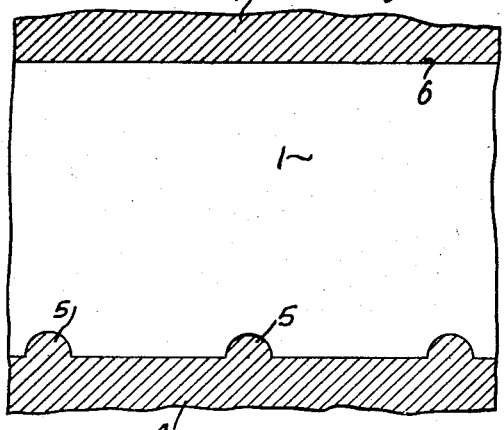
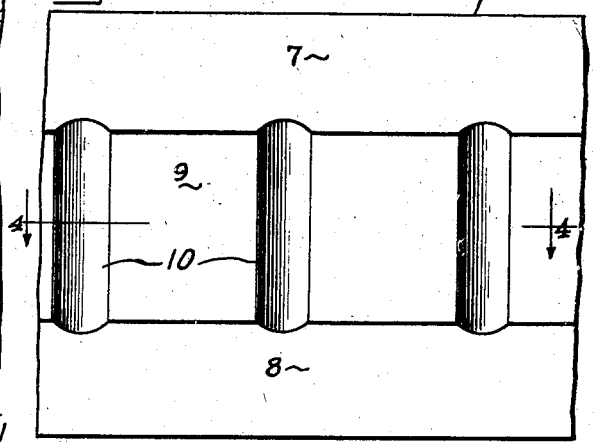
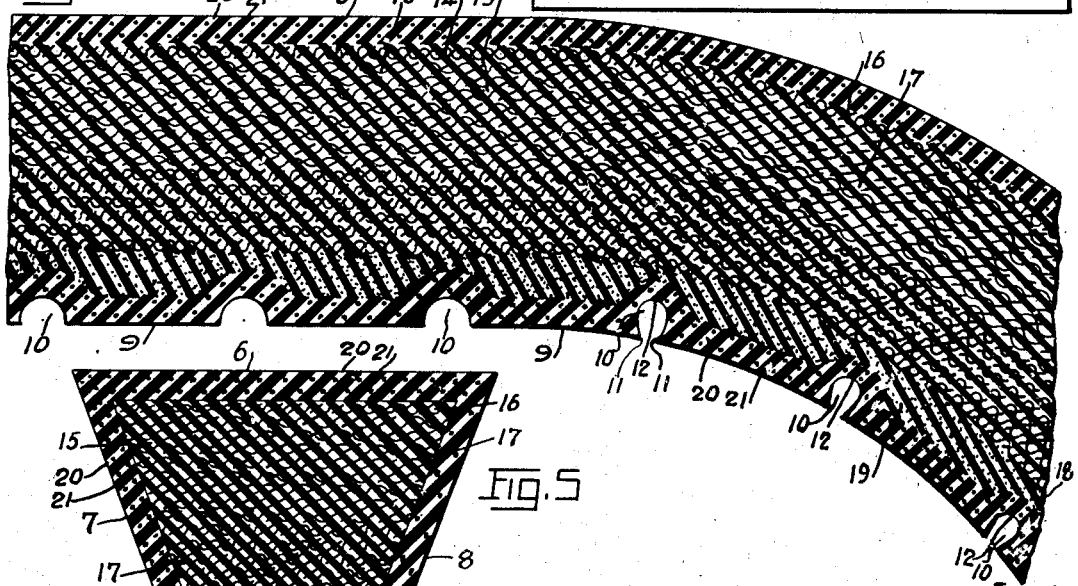
Inventor
ABRAHAM L. FREEDLANDER,
BY
Attorneys Aug. 6, 1940.   A. L. FREEDLANDER   2,210,073
V-BELT WITH SMALL GROOVES ON UNDERSIDE
Filed June 4, 1938   3 Sheets-Sheet 2
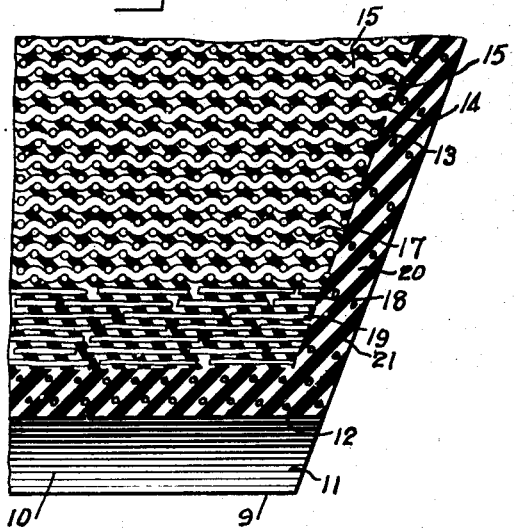
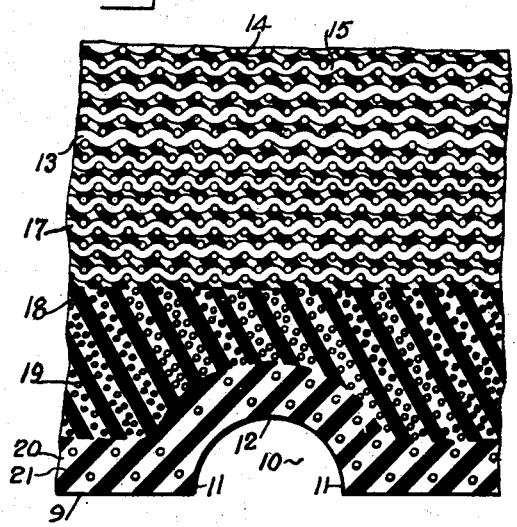
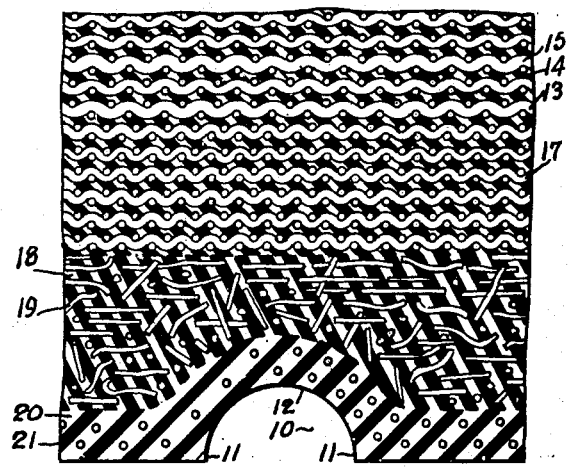
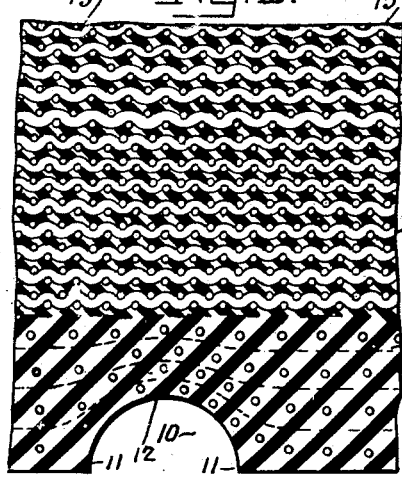
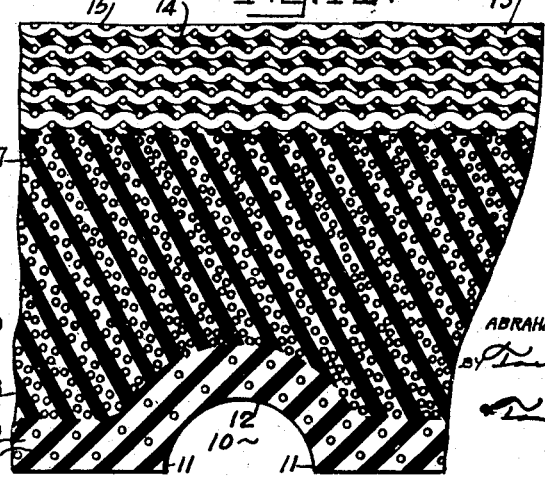
Inventor
ABRAHAM L. FREEDLANDER
Attorneys

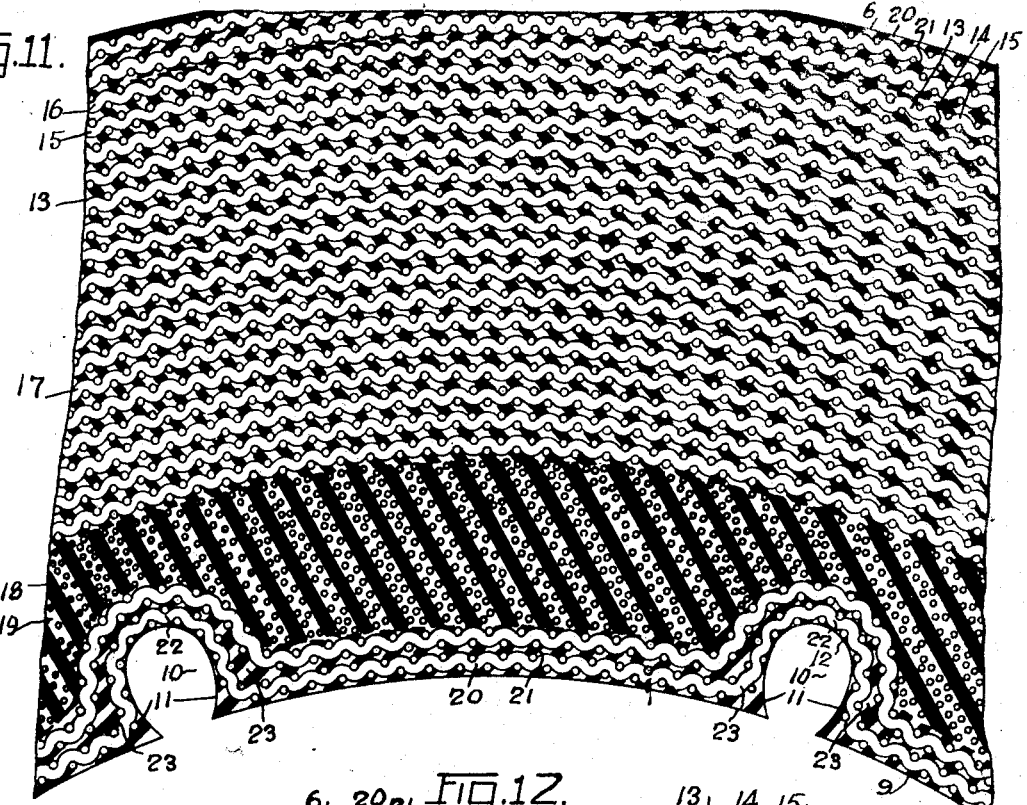
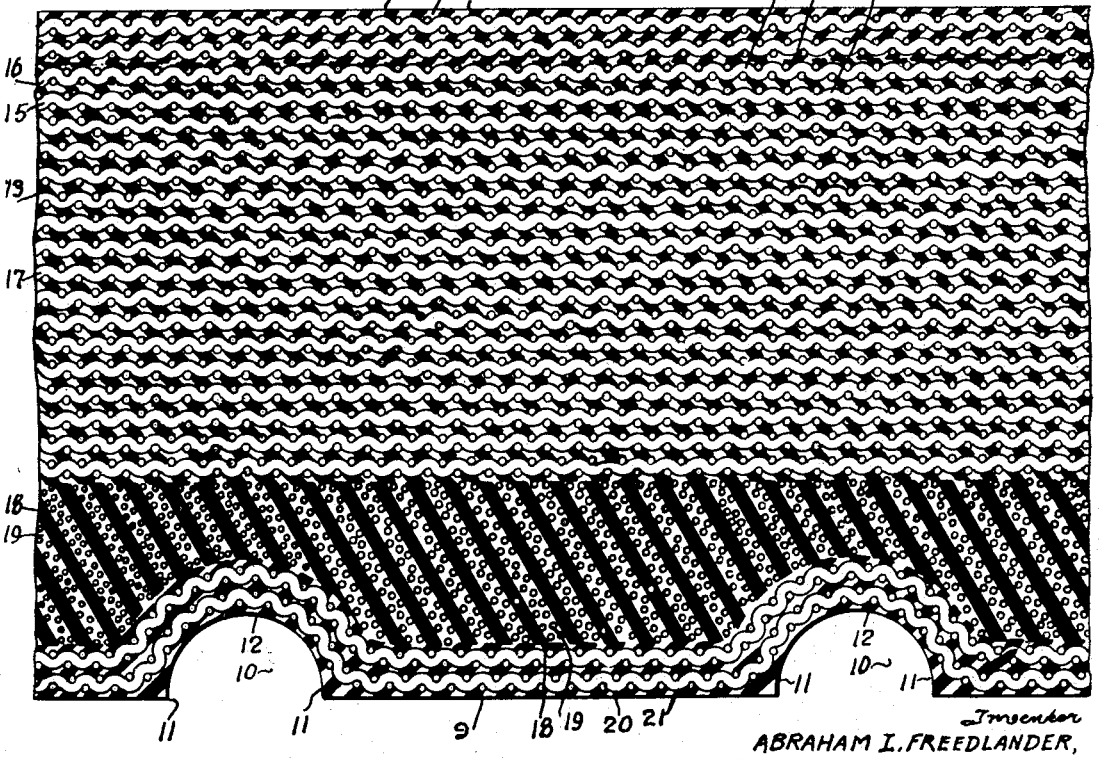

Patented Aug. 6, 1940

2,210,073

UNITED STATES PATENT OFFICE

2,210,073

V-BELT WITH SMALL GROOVES ON UNDERSIDE

Abraham L. Freedlander, Dayton, Ohio, assignor to The Dayton Rubber Manufacturing Company, Dayton, Ohio, a corporation of Ohio Application June 4, 1938, Serial No. 211,909

4 Claims. (Cl. 74—233)

My invention relates to belts and in particular to V-belts.

It is the object of this invention to provide a belt which can pass around a relatively small pulley easily without distortion of the rubber and fabric composing the belt.

It is an object to provide a belt, the underside of which on the compression side has molded therein a plurality of transverse, spaced, relatively small grooves which give great flexibility to the belt, enabling it to negotiate pulleys more easily, and the outstanding feature of which is to prevent distortion of the belt bodily in the grooves. In this connection, there is employed in the compression section of the belt or a part thereof adjacent the grooves, transversely arranged fibers embedded in rubber or the like which are arranged so as to take up the distortion of the fabric on the bottom of the belt in which the grooves are cut or molded. The advantage of this construction lies in the fact that the fibers are cross-wise parallel to the grooves, so that each groove pushes itself, so to speak, up between the fibers, when the belt passes over a pulley. The same result occurs without fibers, but the lateral compressibility of the belt is prevented to a greater degree by the employment of the fine transverse fibers. Such an arrangement of fibers is preferred, but I do not mean to exclude fibers promiscuously mixed in this compression area in the rubber.

It is a further object of this invention to provide a belt having these small grooves on the underside, the lower layers of the belt adjacent the grooves being formed of rubber and fabric, the layers of fabric following the contour of the grooves. In this combination I prefer to provide a resilient area intermediate these layers of fabric adjacent the grooves and the main body of the belt so that any deformation due to the deepening of the grooves as they pass around a pulley will result in a displacement of the intermediate area of rubber without disturbing the main body of the belt composed of layers of rubber and fabric and the like.

The basic principle of this belt is to provide a belt that will accommodate itself when bent on the underside without bulging and without disturbing the main body of the belt.

It is a further object to so interleave layers of rubber and fabric on the underside of the belt adjacent the grooves that when the belt is bent, the layers will tend to separate at the mouth of the groove and compress at the top of the groove so that the rubber between the layers of fabric can flow from the area of compression to the areas of separation without causing the layers of fabric adjacent the groove to project too far into the body of the belt to cause it to bulge laterally or otherwise interfere with its operation.

It is an object of this invention to provide a belt preferably having zones comprising a tension section, a neutral axis section and a compression section, the compression section being divided into a main body section, an intermediate area section, and a bottom cover section which includes the grooves. It will be understood that these sections are not physically separate necessarily but this belt accommodates the free moving of the several sections required by the mechanics of the belt without setting up undue heat and without separation of the plies. The belt is inextensible longitudinally and incompressible laterally. It may be used either with or without a cover. In either event, it has a rigid cross-wise structure, is easily bendable without deformation, and is longitudinally inextensible.

Referring to the drawings:

Figure 1 is a side elevation of the belt mounted upon a driving and driven pulley.

Figure 2 is a vertical section through a mold showing the belt in elevation to indicate how the grooves are molded in the base of the belt after it has been built but before it is vulcanized in the mold.

Figure 3 is a bottom plan view of the belt with the grooves exaggerated in size. The grooves may be transverse at right angles to the axis of the belt or at an angle thereto.

Figure 4 is a longitudinal section on the line 4—4 of Figure 3.

Figure 5 is a section on the line 5—5 looking in the direction of the arrows of Figure 1 showing the construction of the belt transversely.

Figure 6 is a modified form of the belt shown in cross section illustrating in detail the arrangement of the transverse parallel fibers in the compressible section adjacent the covering layers on the bottom of the belt.

Figure 7 is a similar view taken longitudinally through the belt.

Figure 8 is a modified view like Figure 6 showing the fibers promiscuously mixed in the compressible section.

Figure 9 is a view similar to Figure 7 showing the compressible area on the underside of the belt formed with grooves and formed of four layers of fabric material.

Figure 10 is a similar view showing a modified form of construction of the belt in which the main body of the belt is formed of rubber and transverse parallel fine fibers between superimposed layers of fabric and two layers of wrapper in which the grooves are formed on the underside of the belt.

Figure 11 is an enlarged view of the belt as it passes over a pulley showing how the layers of fabric in which the grooves are molded tend to compress over the tops of the grooves and stretch at the edges of the grooves so that the rubber can flow into the enlarged space adjacent the edges of the grooves between the layers of fabric.

Figure 12 is a similar view with the belt in a horizontal position before it passes over the pulley.

Referring to the drawings in detail, the belt 1, preferably of V shape in cross section, is mounted in the V groove pulleys 2 and 3. This belt is formed of a plurality of layers of rubber and fabric, either straight laid or bias laid, and said layers of rubber and transverse fibers are wrapped with layers of rubber and fabric. It is then placed in a mold 4 which has small transverse ridges 5 in the bottom thereof. It is there molded and vulcanized in molded conditions so that when it is taken out of a mold, it consists of a top 6, sides 7 and 8, and a bottom 9 having transverse grooves 10. These grooves are relatively shallow, and are molded in the bottom of the belt.

As will be seen in Figure 4, when the grooves reach the place where the belt is bent in passing over a pulley, the lower edges 11 of the groove approach one another and the upper portion of the groove at 12 projects into the belt while the groove narrows.

Referring to the construction of the belt, it may be built of a variety of different types of textile materials and of rubber or synthetic rubbers or synthetic resins. When I refer to rubber, I comprehend within that term such equivalent materials.

The belt consists of a plurality of superimposed layers of fabric 13 which are impregnated with rubber and have rubber layers 14 therebetween. Those layers at approximately 15 may be either of fabric or cords and constitute the strength band to make the belt inextensible longitudinally. One or more layers 16 are preferably laid on top of the strength band to form a tension area. The compression section is designated at 17. It consists of a plurality of layers of compressible fabric and rubber under which is an inner area 18 of rubber having parallel fibers 19 arranged transversely of the belt. This area 18 is transversely incompressible but it is capable of receiving the deformed grooves in the cover layers as hereinafter described. The cover preferably consists of two layers of fabric 20 embedded in rubber 21. It is in these layers that the grooves 10 are molded. This construction can be seen more clearly in the enlarged sections 11 and 12. In Figure 12 the belt is in straight condition. The grooves are of their normal size. The bottom layers of fabric 20 are parallel to one another and the rubber 21 therebetween is of uniform thickness. When the belt passes over a pulley, as shown in Figure 11, the groove dips and narrows. This tends to bring the layers of fabric closer together at the top of the groove as at 22 and to spread the layers apart adjacent the bottom edges of the groove as at 23. Thus the rubber 21 can flow from the point 22 to the point 23, instead of projecting upwardly at 22 into the intermediate area 18.

In some instances this upwardly projecting movement does take place, as will be seen in Figure 4, and it is for that reason that the inner area 18 of yieldable material that is preferably transversely incompressible, is formed in the belt because any deformation of the grooves 10 into the area 18 will simply displace a portion of the rubber of this area without interfering with the main body of the belt in the general areas 14, 15 and 17.

In Figure 8 the fibers 19 are mixed in all directions. In Figure 9 there are four layers of wrapper, which give a sufficient depth to cushion the movement of the groove without disturbing the main body of the belt, that is, without disturbing the compression section 17. In Figure 10 both the intermediate section 18 and the compression section 17 are made up of a homogeneous body of rubber and transverse fine fibers superimposed upon a two-layer wrapper.

It will be understood that by reference to the tension, compression and neutral axis sections, is meant those sections of a belt into which the belt naturally divides itself, even though there may be no physical demarcation between these sections when the belt is visibly inspected.

It will be observed, therefore, that the belt consists of the wrapper layers in which the grooves are formed; an intermediate cushioning area, and the main body of the belt, which is preferably formed of a compression section, a strength band or neutral axis section, and a tension section. As heretofore stated, these sections are not clearly defined, different areas, but such sections are those into which the belt tends to arrange itself as it passes over the pulleys, and in recognition of that fact, the belt is built preferably of different materials in the different sections so that the strength band will be relatively inextensible longitudinally while the tension and compression sections will be laterally incompressible but are longitudinally stretchable or compressible as the case may be.

It is highly desirable that the line between the intermediate area on its top and the main body of the belt be substantially straight and that this area be sufficiently deep to permit of deformation by the grooves when the shape of the grooves changes without disturbing the main body of the belt.

The advantage of this arrangement over the prior art is that heretofore very large grooves were formed in the belt on the underside which extended into and through the compression section, thereby weakening the belt and setting up various problems such as cracking adjacent the grooves, separation of the compression section from the belt, etc. In some instances considerable heat was developed by reason of these movements. The total side area of the belt was correspondingly reduced, which was an undesirable characteristic in some types of belts.

The present arrangement completely eliminates any disturbance of the main body of the belt; the maximum side area of the belt is maintained; and by having a plurality of very small grooves, a much larger total area for compression is obtained than with a relatively few large molded or cut-through teeth heretofore used in the art.

By the term "groove" I mean a relatively shallow, small transverse depression on the underside of the belt as distinguished from large cut-away portions in the prior art belt which form teeth of large dimensions on the underside of the belt.

It will be understood that I desire to comprehend within my invention such modifications as come within the scope of the claims and the invention.

Having thus fully described my invention, what I claim as new and desire to secure by Letters Patent, is:

1. In combination, in a belt, of a main body portion comprising a tension, neutral axis and compression section, an under section, a grooved section mounted beneath the under section, the grooves in the last-mentioned section being substantially semi-cylindrical and extending up into the under section of the belt, and means for reinforcing said under section whereby deformation of the walls of the grooves is accommodated without distorting the main body portion of the belt.

2. In combination, in a belt, of a belt body comprising a tension, neutral axis and compression section, an under section, a grooved section mounted beneath the under section, the grooves in the last-mentioned section being substantially semi-cylindrical and extending up into the under section of the belt, and means for reinforcing said under section transversely of said belt extending parallel to the longitudinal axis of said grooves, whereby deformation of the walls of the grooves is accommodated without distorting the main body of the belt.

3. In combination, in a belt, of a main body portion comprising superimposed layers of textile material and rubber, an under section of rubber and transversely arranged fibers, and a section on the under side of the belt having substantially semi-cylindrical grooves extending up into the under section of the belt and molded therein transversely of said belt, whereby deformation of the walls of the grooves is accommodated without distortion of the main body of the belt.

4. In combination, in a belt, of a main body portion comprising superimposed layers of textile material and rubber, an under section including reinforcing means, and a section on the under side of the belt having substantially semi-cylindrical grooves extending up into the under section of the belt and molded therein transversely of said belt, whereby deformation of the grooved walls is accommodated without distortion of the said main body portion of the belt.

ABRAHAM L. FREEDLANDER.